Oct. 12, 1943.  F. F. DAVIS  2,331,460
BEVERAGE DISPENSING SYSTEM
Filed Oct. 26, 1940  3 Sheets-Sheet 3

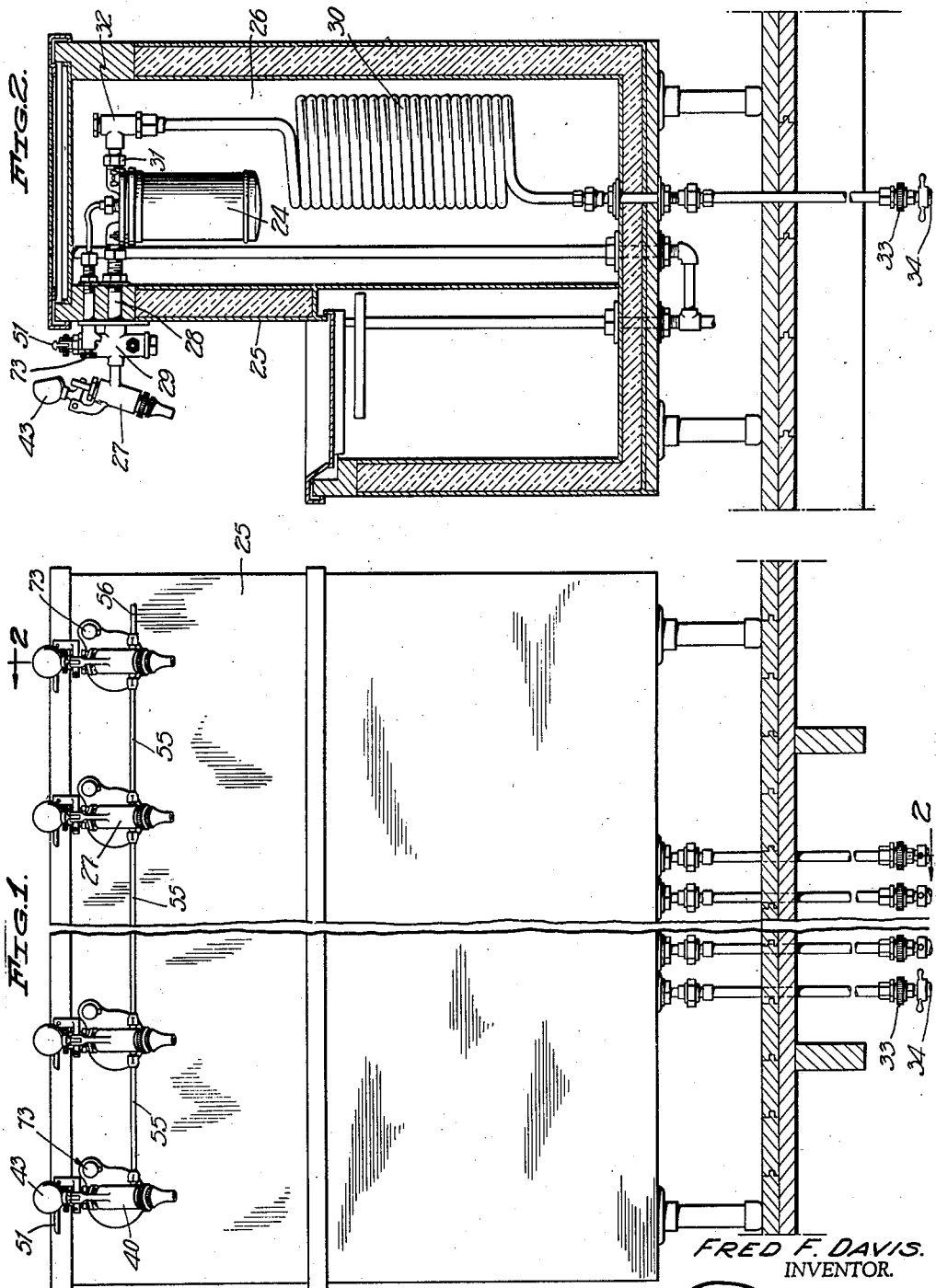

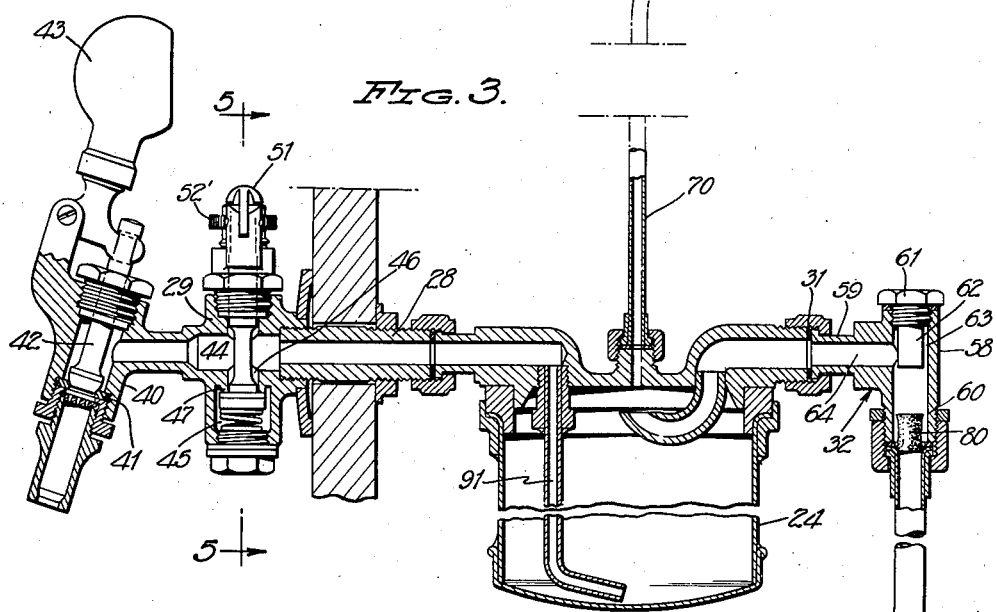
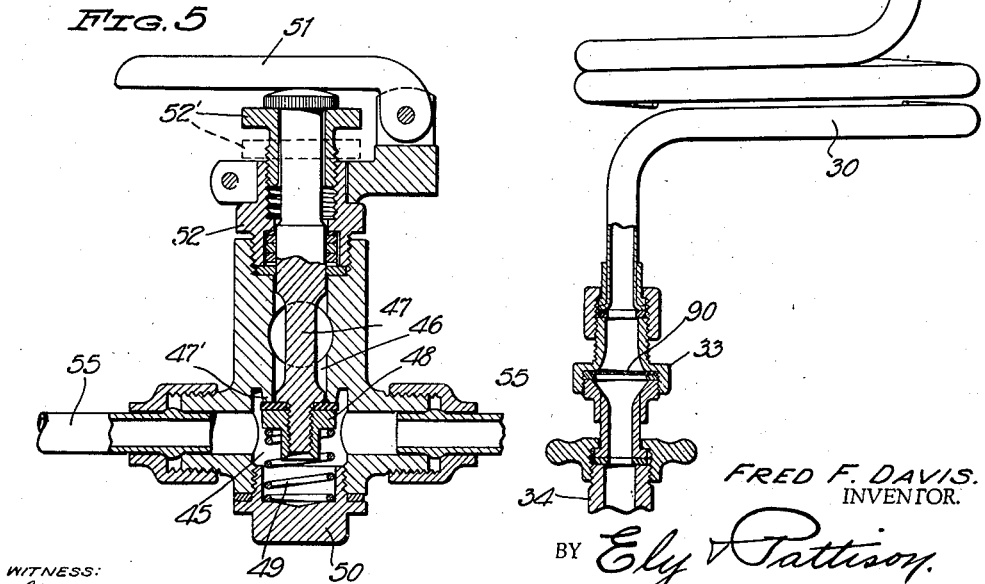

FRED F. DAVIS,
INVENTOR.

BY Ely & Pattison
ATTORNEYS

WITNESS:

Patented Oct. 12, 1943

2,331,460

UNITED STATES PATENT OFFICE 2,331,460

BEVERAGE DISPENSING SYSTEM

Fred F. Davis, New York, N. Y., assignor to Davis-Gerrish Holding Corporation, New York, N. Y., a corporation of New York Application October 26, 1940, Serial No. 362,917

8 Claims. (Cl. 225—12)

The present invention relates to new and useful improvements in fluid dispensing apparatus.

In its present embodiment, the invention is illustrated as apparatus for dispensing beer, ale and similar charged beverages, but it is to be understood that it has wider fields of application than that in which it is herein presented.

Beverages of the types above mentioned are generally dispensed at points removed with relation to their points of storage. Such practice necessitates the employment of pipe lines, faucets and other appliances to convey the beverage to the dispensing point and to control the dispensing thereof.

The character of the beverages, particularly beer and ale, is such as to produce conditions within the apparatus which have a decided deleterious effect upon the beverage thus making it necessary to resort to periodical cleansing of the apparatus.

This cleaning of the apparatus, as it is generally practiced, requires a complete shutdown of the apparatus during the cleaning period and a loss of beverage as well as time accompanies each cleansing operation, with the result that often the apparatus is not subjected to the cleansing operation as frequently as it should to maintain the highest standard of quality of the beverage dispensed.

Further, as generally practiced, the cleansing operation is performed by concerns whose business consists solely of servicing such apparatus which practice entails a service charge to be borne by the proprietor.

One object of the present invention is to improve the construction and method of operation of beverage dispensing apparatus and so to construct such apparatus that beverages such as beer, ale and the like, may be dispensed in the same condition in which they are supplied in bulk to the establishment, which in turn dispenses them to the public.

A feature of the invention resides in the provision of a novel construction of apparatus whereby the cleansing of the apparatus may be accomplished without waste or loss of any of the beverage as a result of the cleansing operation.

Another feature of the invention resides in a novel construction of apparatus whereby the cleansing operation may be accomplished by the attendant himself.

These two features I consider highly important since, particularly in the case of beer, which is generally stored in kegs, they permit of a thorough cleansing of the apparatus after the contents of a single keg has been dispensed if desired, thus insuring a clean and highly satisfactory operating condition of the apparatus at all times which results in the dispensing of the beverage in its original form.

Other features of the invention relate to certain novel and improved constructions, arrangements and combinations of parts hereinafter described and particularly pointed out in the claims, the advantages of which will be readily understood and appreciated by those skilled in the art.

The invention will be clearly understood from the accompanying drawings illustrating the invention in its preferred forms and the following detail description of the constructions therein shown:

In the drawings,

Figure 1 is a view in front elevation partly broken away of a dispensing apparatus constructed in accordance with the present invention;

Figure 2 is a vertical sectional view taken substantially on the line 2—2 of Figure 1;

Figure 3 is a schematic view partly in section and partly in elevation, certain elements of the apparatus being removed;

Figure 4 is a detail sectional view taken substantially on the line 4—4 of Figure 1, the view being on an enlarged scale;

Figure 5 is a detail sectional view on an enlarged scale taken substantially on the line 5—5 of Figure 3;

Figure 6:
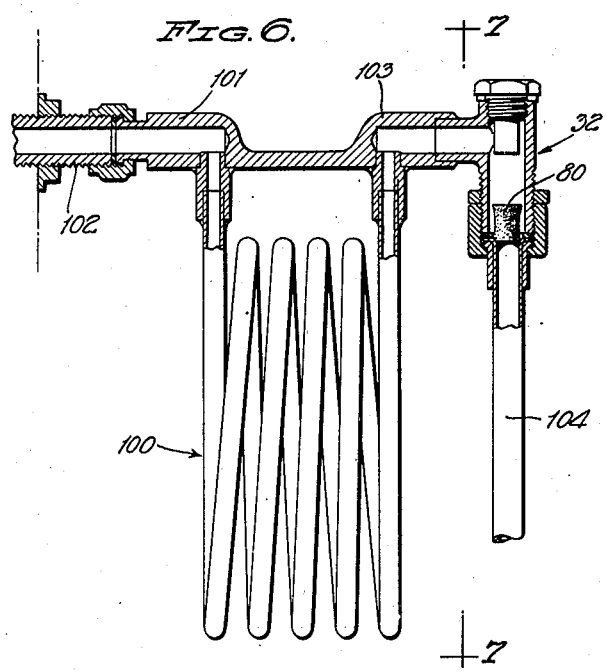
Figure 6 is a fragmentary sectional view illustrating the invention as applied to a modified form of dispensing apparatus.

In that embodiment of the invention illustrated in Figures 1 through 5, I have shown the invention embodied in a beverage system which is of somewhat the conventional type.

In said Figures 1 through 5, the reference character 25 designates a conventional bar fixture having the refrigeration compartment 26 and dispensing faucets 27.

Mounted within the refrigerating compartment, there is the conventional draw off tank 24 which is connected to its respective faucet 27 by means of a pipe 28 in which is incorporated a valve 29, the purpose and operation of which will be hereinafter more specifically described.

The reference character 30 designates a refrigerating coil and its upper end is connected to the draw off tank by means of a coupling 31 and a fitting 32 to be hereinafter more specifically described.

The opposite end of the refrigerating coil 30 is connected by means of a fitting 33 to a keg tapping rod or the like 34.

Inasmuch as each of the faucets and its associated parts which go to make up the system are substantially the same construction, the description of one will be deemed sufficient.

The faucets 27 may be of any desired type for the purpose, the faucets herein illustrated comprising a body portion 40 having a valve seat 41 which is engaged by a reciprocating valve 42 to close the faucet and prevent discharge of fluid therefrom. The valve 42 is operated to and from its closed position by means of a pivoted handle 43.

In the present embodiment of the invention, the valve 29 heretofore mentioned is incorporated directly in the faucet 27 as best illustrated in Figure 3 of the drawings.

Referring to Figures 3 and 5 of the drawings, the valve 29 includes a chamber 44 which has communication with both the faucet 27 and the pipe 28. Beneath the chamber 44 there is a chamber 45 and this chamber has communication with the chamber 44 through a passage 46 which is defined by a valve seat 47'. Extending through the chamber 45 and the passage 46, there is a valve stem 47 the head 48 of which is positioned in the chamber 45 in position to engage the seat 47' heretofore mentioned. The valve head is held normally in engagement with the seat 47' by means of a coil spring 49 interposed between the valve head and the bottom wall of the chamber 45 which latter is preferably in the form of a removable plug 50.

The valve 48 is forced from its seat by means of a pivoted lever 51, which engages the upper end of the valve stem 47, which latter projects through a suitable packing gland 52 threaded in the upper wall of the valve 29. From the foregoing it will be obvious that normally, the valve head 48 serves to cut off communication between the chambers 44 and 45.

To prevent accidental operation of the valve 29, a nut 52' may be positioned as illustrated in full lines in Figure 5, the nut 52' being capable of movement to the dotted line position shown in Figure 5 to permit of movement of the valve 48 to its open position.

By reference to Figure 1, it will be noted that the chambers 45 of the several valves 29 are connected by pipe 55 and that one of said chambers 45 is connected with a supply pipe 56, which latter is preferably the city water supply system.

The fitting 32 heretofore mentioned comrises a main body portion 58 having two legs 59 and 60. The leg 59 forms the means by which the fitting 32 is connected to the tank 24 by the coupling 31, the leg 60 forming the means by which the fitting is connected to the upper end of the refrigerating coil 30.

The top wall of the body portion is closed by means of a screw plug or the like 61 which has an extension 62, the lower end of which projects into the chamber 63 of the body portion 58 of the fitting 32.

The internal diameter of the chamber 63 and that of the passage 65 through the leg 60 is greater than the diameter of the extension 62 and the passage 64 of the leg 59 and it will be noted by reference to Figure 4, that the lower end of the extension 62 is substantially on a line with the bottom of the passage 64.

Leading from the top of the draw off tank 24, there is a bleed line 70 which leads to a bleed valve 73 mounted upon the faucet 27 as best illustrated in Figure 2.

As best illustrated in Figure 4, this bleed valve 73 comprises a body portion 74 having a chamber 75 from which leads a small passage 71 which terminates at its outer end in a seat 76. A plug 72 carries a valve 77 for engagement with the seat 76 and a relatively small rod 78 which extends through the passage 71.

The plug 72 has threaded engagement with the valve body and by rotation of the plug, the valve may be opened or closed. A discharge passage 79 leads from the body of the valve 73.

The reference character 80 designates a mechanical cleaning element which in this form of the invention comprises a relatively short section of sponge rubber or similar highly compressible porous material.

In Figure 4 of the drawings, this mechanical cleaning element is illustrated in position in the chamber 63 of the fitting 32, but it is to be understood that it is bodily movable through that portion of the system between the fitting 32 and the fitting 33, to effect a cleaning thereof and the manner in which this is accomplished, will now be described.

Referring to Figures 1 through 5, we will assume that the entire system is filled with the beverage to be dispensed, the tap rod 34 extending into a keg or other container not shown, in which the beverage to be dispensed is stored under pressure.

To draw a portion of the beverage it is only necessary to rock the hand lever 43 in Figure 3 to the left and open the valve 42. It will be noted from Figure 3 that in this position of the parts and at all times while the system is filled with the beverage, the communication between the chambers 44 and 45 will be cut off by means of the valve 29.

Assuming now that the supply of beverage has become exhausted and it is desired to subject the system to a cleaning operation before the empty keg or container has been replaced by means of a filled one.

To accomplish this purpose the valve 43 of the draw off faucet is closed. The lock nut 52', see Figure 5, is turned down as illustrated in dotted lines, to permit of movement of the valve stem 47 to open the valve 29 by depressing the pivoted lever 51. Since the line 55 is the line of city water under pressure, water under such pressure will be introduced into the system and fill the same from the valve 42 to the empty keg or container. As the water passes through the system under this pressure the cleaning element 80 is carried thereby through the refrigerating coil 30 removing any deposits upon the interior thereof. After the cleaning element 80 has passed through the coil, it passes to the fitting 33 which includes a screen or similar baffle 90 which prevents entrance of the cleaning element 80 into the tap rod 34. When the water under city pressure is first introduced into the system, it passes through the pipe 28 into the draw off tank 24 by means of a pipe or nozzle 91 which projects the same, with a swirling motion, against the bottom of the draw off tank 24. As the draw off tank 24 fills with water the water passes through the fitting 32 and at this stage picks up the mechanical cleaning element 80 moving it through the system to the fitting 33 in the manner heretofore described.

This introduction of water under city pressure together with movement through the system of the mechanical cleaning element 80, has thoroughly cleaned the system in one direction. The valve 29 is maintained in its open position by depression of the pivoted lever 51 for sufficient time to permit the necessary quantity of water under city pressure passing through the system and into the empty keg or container to effect a thorough cleaning of the system.

The next step consists in relieving pressure from the pivoted lever 51 and permitting the valve 29 to move to closed position under the influence of the spring 49 after which the lock nut 52 is again turned to the position in which it is shown in full lines in Figure 5, to prevent accidental operation of the valve 29. This having been accomplished, flushing of the system by means of water under city pressure ceases. If now the valve 42 of the draw off faucet 27 be moved to open position, pressure in the keg or container will force the water backwardly through the system carrying with it the mechanical cleaning element 80 to its position within the fitting 32 where it was trapped. By reason of the construction of the fitting 32, the water in the system between the fitting 32 and the tap rod 34 passes around the cleaning element 80 in its trapped position in the fitting 32, through the draw off tank 24, pipe 91 and the draw off faucet 27 until all of the water has been removed from the system. From the foregoing, it will be apparent that after the aforedescribed cycle of operation has been completed, the system has been thoroughly cleansed and that such cleaning of the system may be accomplished after the contents of each keg or container have been dispensed.

It will be obvious that the system after the cleaning operation heretofore described will contain a quantity of air or gas and the operation of tapping a new keg or container will now be described.

The tap rod is placed in the keg or container in the conventional manner and connected to the system. After this has been accomplished, the tap rod is opened in the usual manner permitting the beverage to pass through the tap rod into the system. At this stage the attendant by turning the plug 72 of the bleed valve 73 which permits of the air or gas under pressure being bled from the system and a free movement of the beverage therethrough under pressure present in the keg or container. In addition to the function just described the bleed valve 73 also permits of the discharge of any foam that may be created in the draw off tank 24 by reason of the flowing of the beverage thereto under pressure. The foam emits from the passage 27 in the form of small bubbles and when the foam has been completely discharged from the draw off tank 24 the fact will be evidenced by the emission of a fine stream of clear beverage from the bleed valve 73. This condition indicates that air or gas and foam have been drawn from the system and the bleed valve 73 is then closed.

After the above described operations have been completed, the entire system has been filled with fresh beverage and the first beverage discharged upon operation of the draw off valve 27 is in perfect condition.

Figure 7:
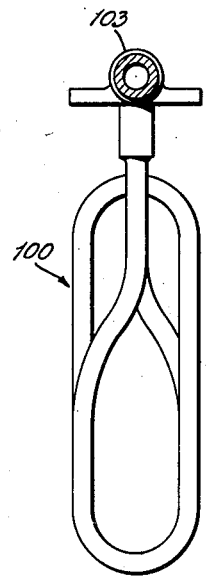
Figure 7 is a detail sectional view taken substantially on the line 7—7 of Figure 6.

In Figures 6 and 7 there has been illustrated a slightly modified form of invention in which a coil 100 has been substituted for the draw off tank 24 in the heretofore described form of the invention. One end of the coil is connected to a fitting 101 which in turn is connected to the pipe 102 which leads to the draw off faucet not here in illustrated but which is of the same type as heretofore described. The other leg of the coil 100 is connected to a fitting 103 which in turn is connected to the fitting 32 heretofore described. Except for the described parts, this form of the invention is the same as heretofore described in that the fitting 32 forms a trap for the mechanical cleaning element 80 which passes through the line 102 and the refrigerating coil 30.

While as above stated this modified system differs only in the substitution of the draw off or expansion coil 100 for the draw off tank 24, its operation is slightly different and this difference will now be described.

When the system is full of beverage, the beverage is drawn in the same manner as heretofore described by operation of the valve lever 43. After the keg or container has been emptied, the heretofore described operation to subject the system to the action of water under city pressure is carried out and said water passing through the coil 100 will force the mechanical cleaning element 80 through the refrigerating coil 30 in the same manner as heretofore described effecting a cleaning of the system as stated.

However, after the cleaning has been completed and a new keg or container has been tapped, it will be noted that the system will be filled with water and it will be necessary to displace this water with beverage in order that the beverage may be dispensed. This is accomplished by an opening of the draw off faucet 27, it being understood of course that the valve 48 of the water system has been previously closed, which action permits of the beverage under pressure operating to force the mechanical cleaning element 80 from its position in the fitting 33 through the refrigerating coil 30 to its trapped position in the fitting 32, forcing the water in the refrigerating coil 30 and the remainder of the system between the keg or container and the fitting 32 ahead of the mechanical cleaning element. From the fitting 32 the beverage forces the water from the fitting 103 through the coil 100, fitting 101 and pipe 102 and upon complete discharge of the water from the draw off faucet, the beverage will begin to discharge in perfect condition from the draw off faucet.

Figure 8:
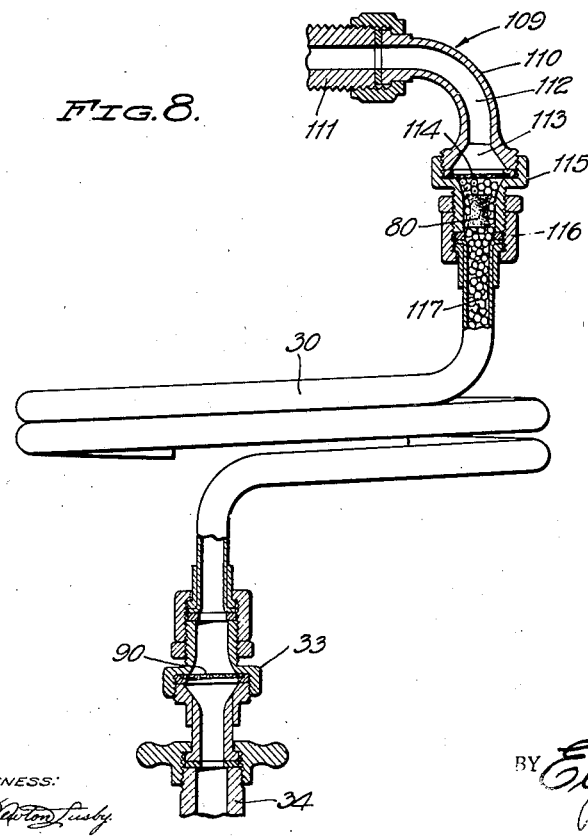
Figure 8 is a fragmentary sectional view illustrating a modified form of the invention.
Figure 9:
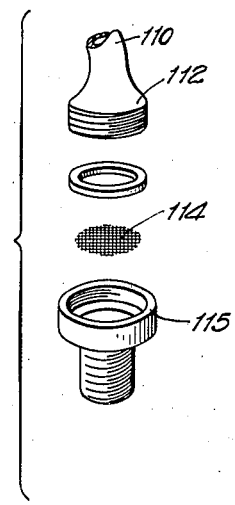
Figure 9 is a distended perspective view of a portion of the device illustrated in Figure 8.

In that form of the invention shown in Figures 8 and 9, the fitting 32 is dispensed with and a fitting 109 comprising an elbow 110 which may be connected either to the draw off tank 24 or the draw off and expansion coil 100 by a pipe section 111.

The fitting 110 has a pipe 112 terminating in a flared portion 113 the larger end of which is closed by a screen or similar baffle 114. A nipple 115 is threaded upon the end of the elbow 110 and by means of a coupling 116, the nipple 115 is attached to the upper end of the refrigerating coil 30. In this form of the invention, the fitting 33 heretofore referred to is employed for attaching the opposite end of the coil to the tap rod 34.

In this latter described form of the invention, the mechanical cleaning element includes a plurality of relatively small hard crystal like elements 117 combined with the soft pliable porous mechanical cleaning element 80 heretofore described. The crystals are movable through the system between the fitting 109 and the fitting 33 which of course includes the refrigerating coil 30.

The crystals 117 move independently of each other at random and said crystals individually and as a group are movable at random relatively to the mechanical cleaning element 80 which is also movable at random relatively to the crystals.

In this form of the invention, the cleaning of the system is the same as that described for the first described modified form of the invention. That is, there is no bleed valve for bleeding the system of air or gas, the beverage under pressure in the keg or container acting directly through the tap rod 34 and the refrigerating coil 30 to move the mechanical cleaning elements through the system from the fitting 33 to the fitting 102 after the mechanical cleaning elements have been forced from the fitting 109 to the fitting 33 by means of water under city pressure to effect a cleaning of the system in the heretofore described manner.

From the foregoing, it will be apparent that the present invention provides a new and improved apparatus and method of operating beverage dispensing systems, and one which permits of a thorough cleansing of the system by the attendant after the contents of each keg or container has been dispensed, if so desired.

The invention has been herein illustrated and described in its preferred forms. It is to be understood, however, that the invention is not to be limited to the specific details of construction herein illustrated and that it may be practiced in various other forms which rightfully fall within the scope of the appended claims without departing from the spirit thereof.

Having thus described the invention, what is claimed as new is:

1. In apparatus for dispensing beverages under pressure, in combination, a source of beverage supply, a dispensing unit, a system of piping connecting the source of beverage supply with the dispensing unit, a mechanical cleaning unit permanently retained within and movable through the piping system in one direction under the influence of said beverage under pressure therein and separate means for moving the mechanical cleaning unit through the system in the opposite direction.

2. In apparatus for dispensing beverages under pressure, in combination, a source of beverage supply, a dispensing unit, a system of piping connecting the source of beverage supply with the dispensing unit, a mechanical cleaning unit permanently retained within and movable through the piping system in one direction under the influence of said beverage under pressure in the system, means for trapping the cleaning unit at a point between the source of supply of said beverage under pressure and the dispensing unit, and means independent of the beverage under pressure for moving the cleaning unit through the system in the opposite direction.

3. In apparatus for dispensing beverages under pressure, in combination, a source of beverage supply, a dispensing unit, a system of piping connecting the source of beverage supply with the dispensing unit, a mechanical cleaning unit permanently retained within and movable through the piping system in opposite directions under the influence of fluid under pressure in the system, and means for trapping the cleaning unit at a point between the source of supply and the dispensing unit and for permitting of the flow of liquid through the piping system in either direction around the mechanical cleaning unit regardless of the direction of flow of fluid under pressure through the system.

4. In apparatus for dispensing beverages under pressure, in combination, a source of supply of beverage under pressure, a dispensing unit, a system of piping connecting the source of beverage supply with the dispensing unit, a mechanical cleaning element permanently retained within and movable in one direction through the system under the influence of the beverage under pressure in the system, means for trapping the mechanical cleaning element at a point between the source of beverage supply and the dispensing unit and separate means for moving the cleaning unit through the system in the opposite direction.

5. In apparatus for dispensing beverages under pressure, in combination, a source of supply of beverage under pressure, a dispensing unit, a system of piping connecting the source of beverage supply with the dispensing unit, a mechanical cleaning element movable through the piping system in one direction by the beverage under pressure at the source of supply, means for introducing water under pressure to the piping system, for moving the cleaning element in the opposite direction and means for limiting the movement of the mechanical cleaning element in the piping system without preventing the flow of beverage or water therethrough.

6. In apparatus of the type described in combination, a source of supply of beverage under pressure, a dispensing unit, a pipe line for connecting the source of beverage supply with the dispensing unit, a mechanical cleaning element confined within said pipe line and normally inactive therein during the passage of beverage therethrough, and means for passing water from the dispensing unit through the pipe line in the direction of the source of beverage supply after the beverage supply has been exhausted for moving said mechanical cleaning element through the pipe line to effect a cleaning thereof.

7. In apparatus for dispensing beverages under pressure, in combination, a source of beverage supply, a dispensing unit, a system of piping connecting the source of beverage supply with the dispensing unit, a mechanical cleaning unit movable through said piping system in one direction by the passage of beverage under pressure therethrough, and in the opposite direction by a fluid introduced under pressure in a direction opposite to the direction of flow of the beverage under pressure, means included in the piping system for preventing exit of the cleaning unit therefrom under the influence of the beverage under pressure and to permit of the flow of beverage around the cleaning unit, and means included in the piping system for preventing exit of the cleaning unit therefrom under the influence of the fluid introduced into the piping in a direction opposite to the direction of flow of the beverage under pressure and to permit of the flow of said fluid.

8. In apparatus for dispensing beverages under pressure, in combination, a source of beverage supply, a dispensing unit, a system of piping connecting the source of beverage supply with the dispensing unit, a mechanical cleaning unit permanently retained within and movable through the piping system in one direction by movement of the beverage therethrough, a second fluid under pressure movable through the piping system under pressure in a direction opposite to that of the flow of beverage under pressure for moving the cleaning unit through the piping system, and means for introducing said second mentioned fluid to the system.

FRED F. DAVIS.